Figure 9:
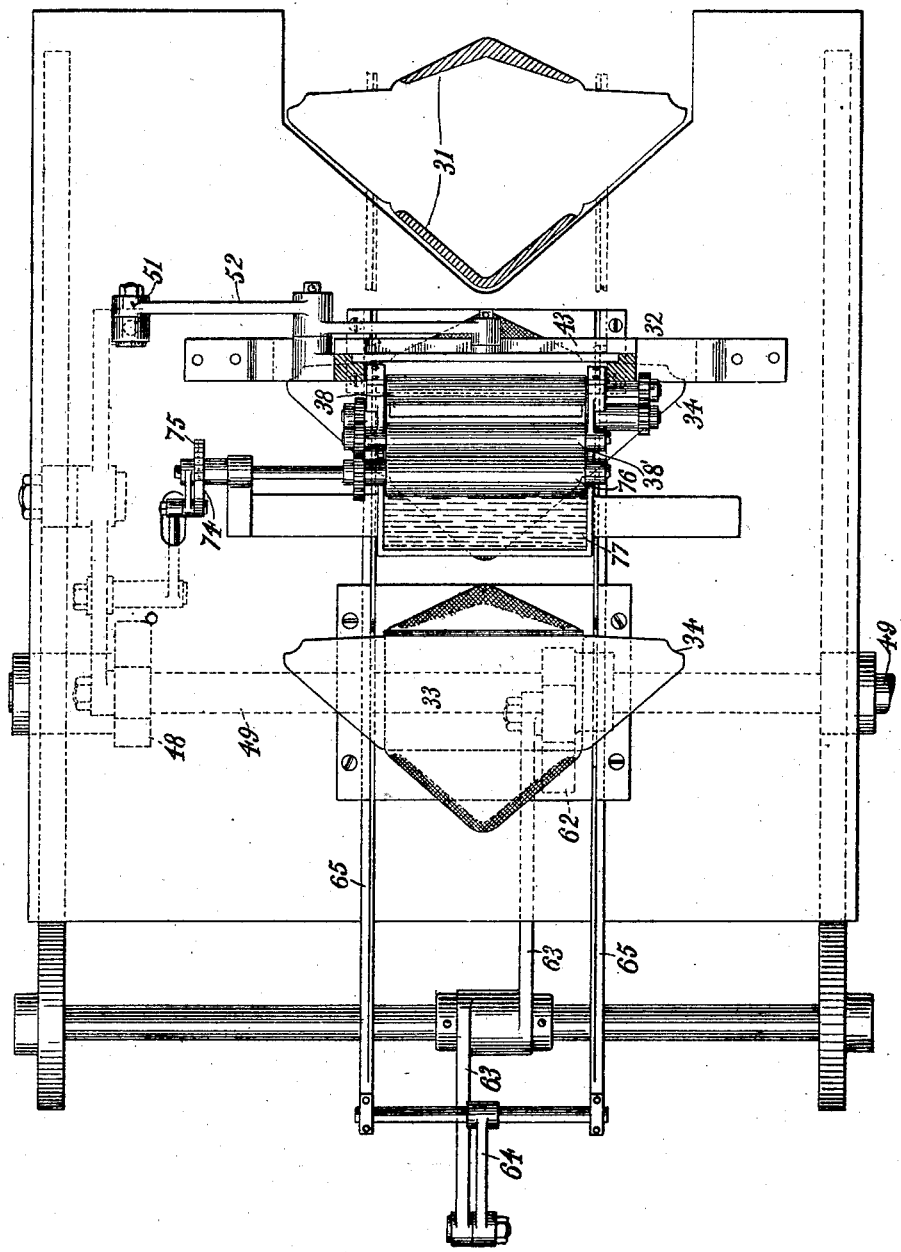
Figure 10:
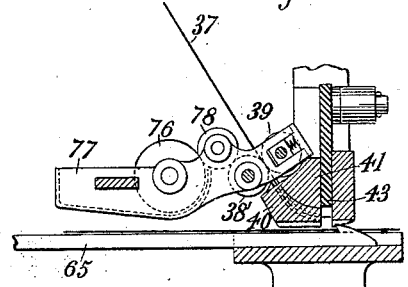

No. 679,921. Patented Aug. 6, 1901.
W. S. TIMMIS.
MACHINE FOR MANUFACTURING ENVELOPS.
(Application filed June 1, 1900.)
(No Model.) 8 Sheets—Sheet 1.
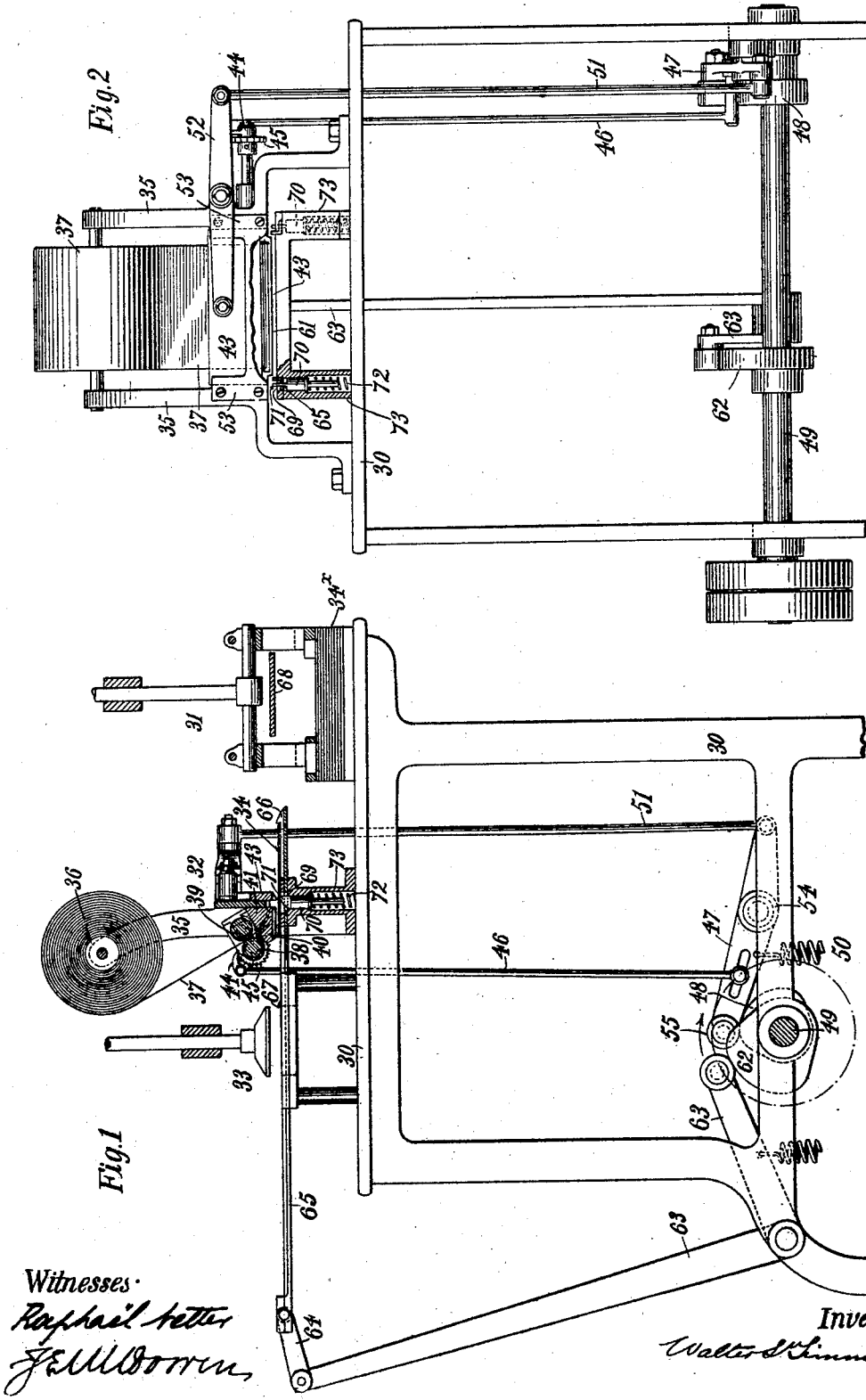
Witnesses:
Raphael Netter
J. Ellsworth Dowen
Inventor
Walter S. Timmis

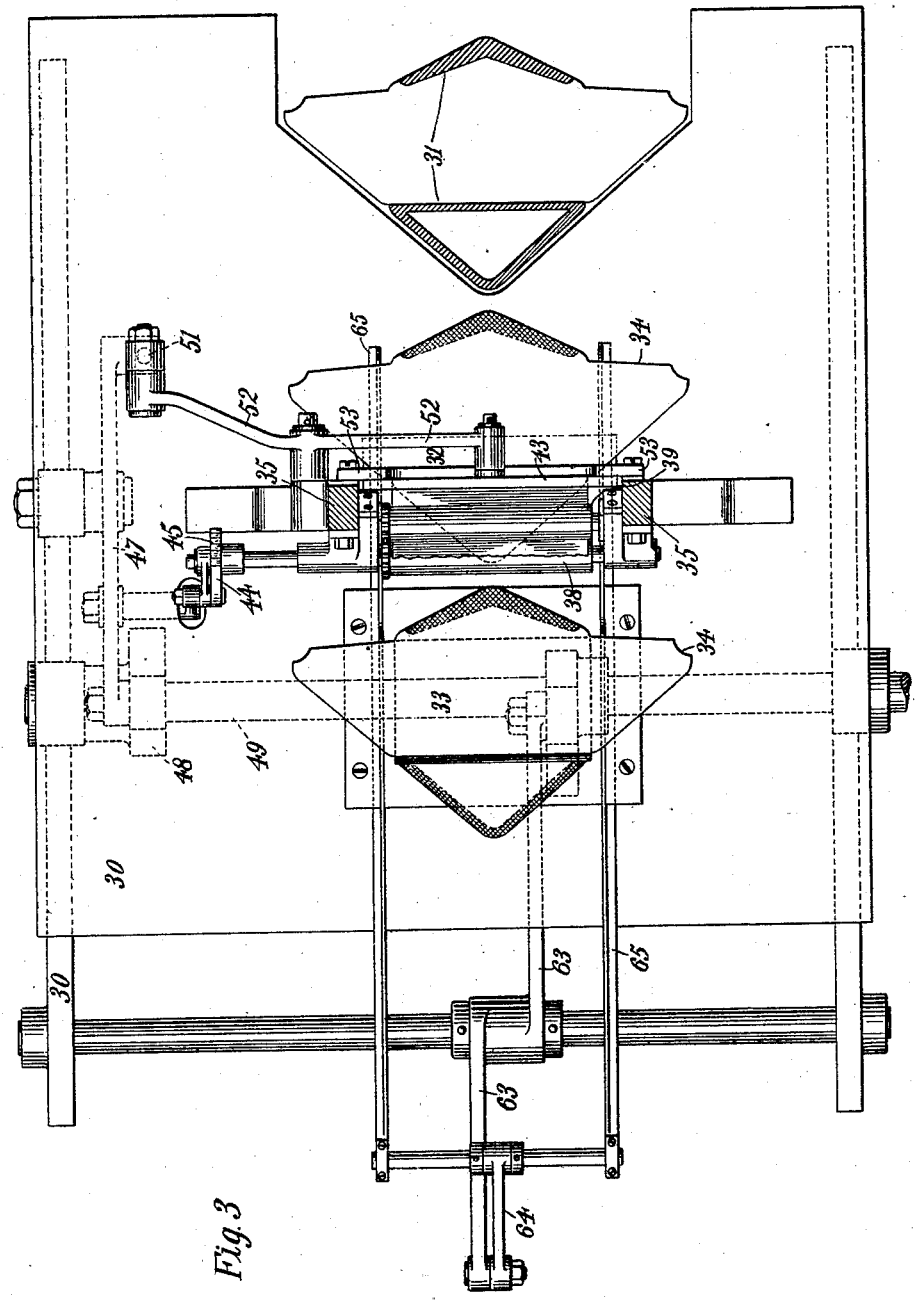

No. 679,921. Patented Aug. 6, 1901.
W. S. TIMMIS.
MACHINE FOR MANUFACTURING ENVELOPS.
(Application filed June 1, 1900.)
(No Model.) 8 Sheets—Sheet 3.
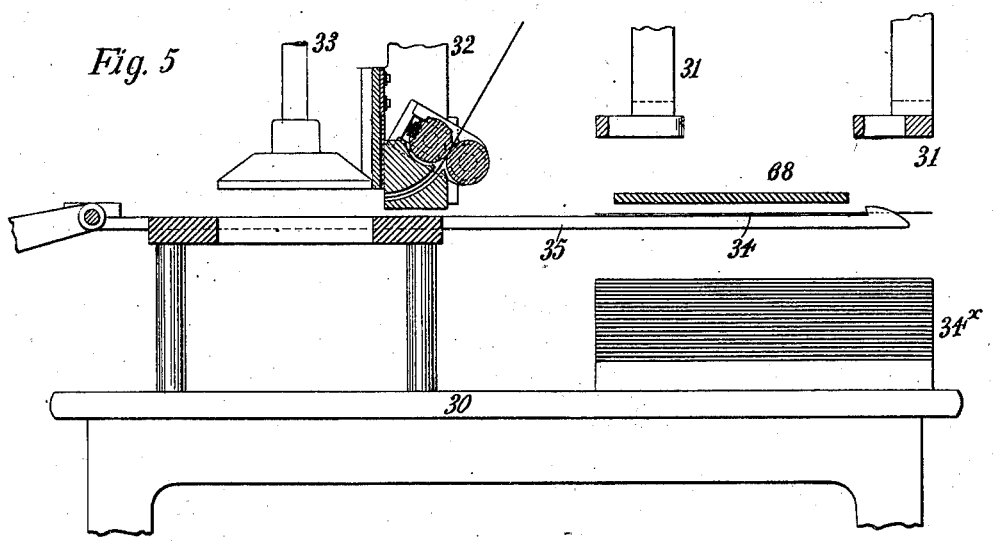
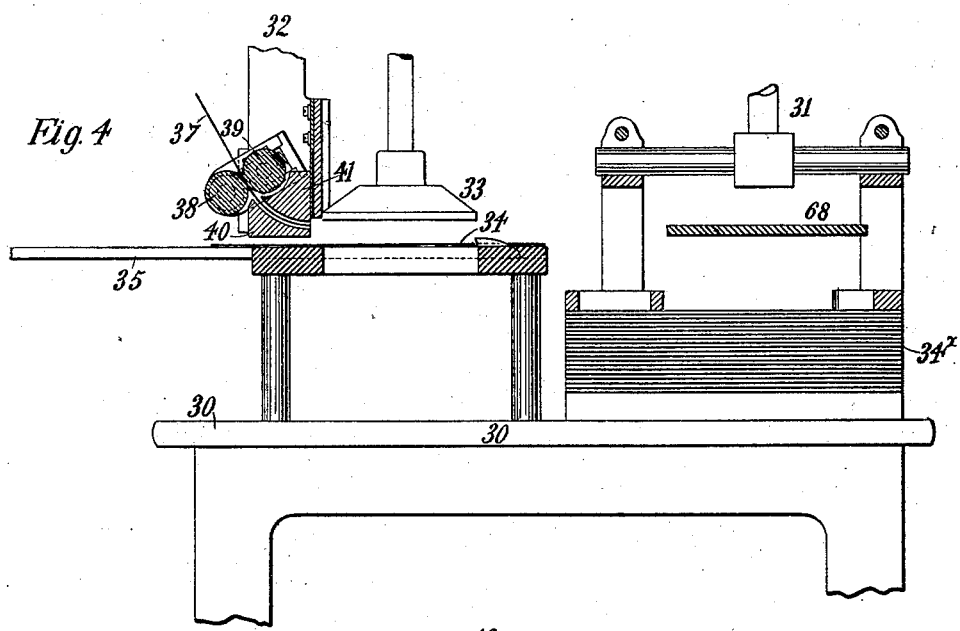
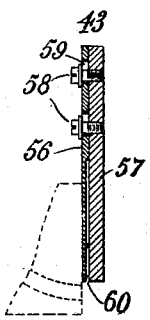
Witnesses: Inventor

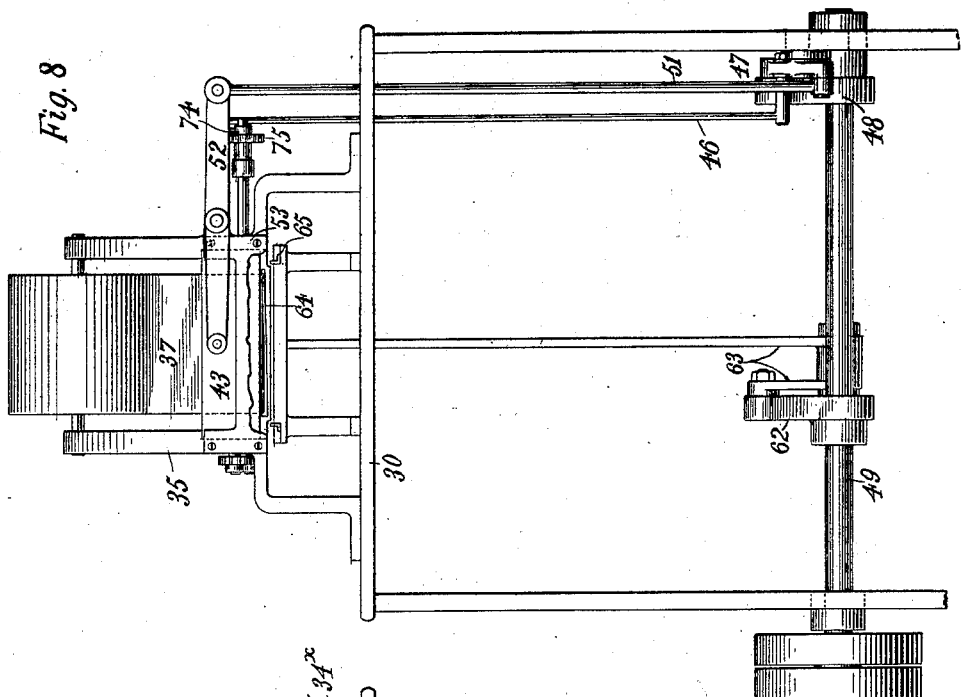

No. 679,921. Patented Aug. 6, 1901.
W. S. TIMMIS.
MACHINE FOR MANUFACTURING ENVELOPS.
(Application filed June 1, 1900.)

(No Model.) 8 Sheets—Sheet 5.

Witnesses:

Inventor

No. 679,921. Patented Aug. 6, 1901.
W. S. TIMMIS.
MACHINE FOR MANUFACTURING ENVELOPS.
(Application filed June 1, 1900.)

(No Model.) 8 Sheets—Sheet 6.

Witnesses:
Raphaël Petter
J. M. Bowen

Inventor
Walter S. Timmis

No. 679,921. Patented Aug. 6, 1901.
W. S. TIMMIS.
MACHINE FOR MANUFACTURING ENVELOPS.
(Application filed June 1, 1900.)
(No Model.) 8 Sheets—Sheet 7.
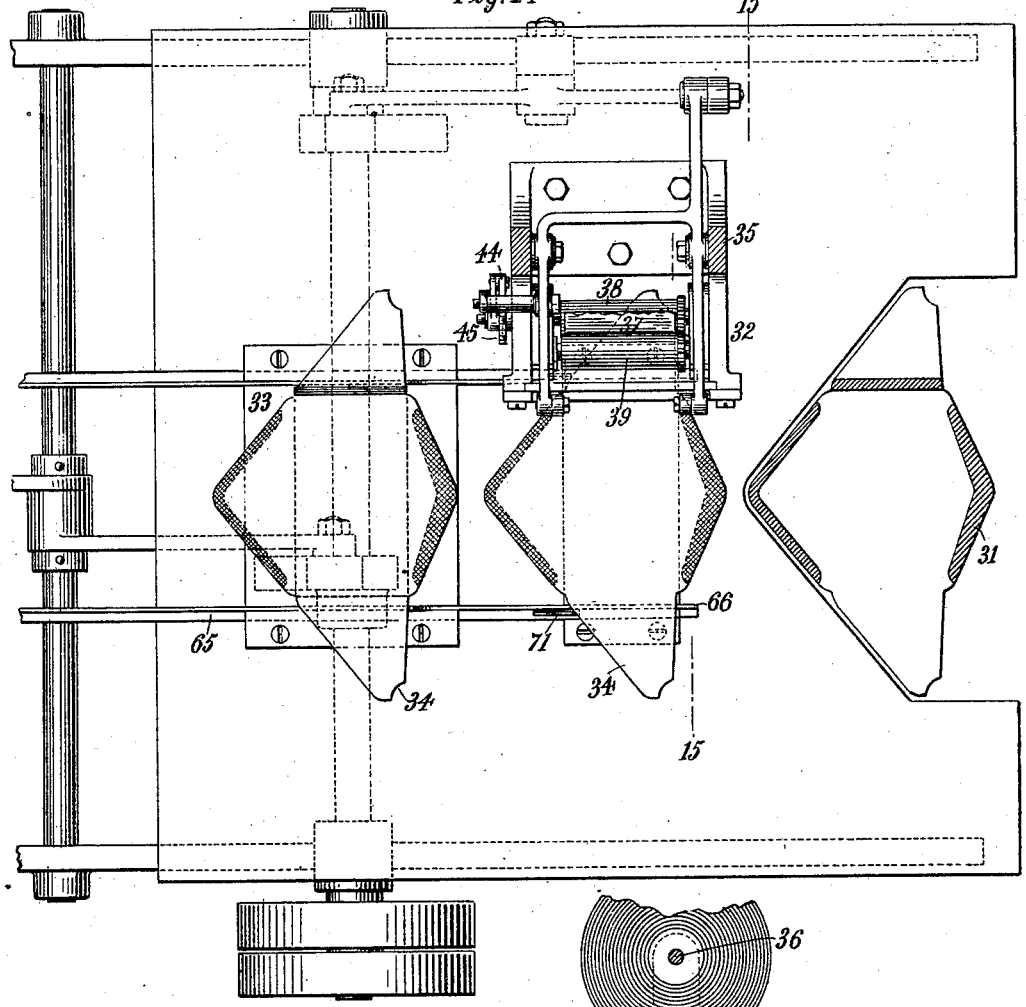
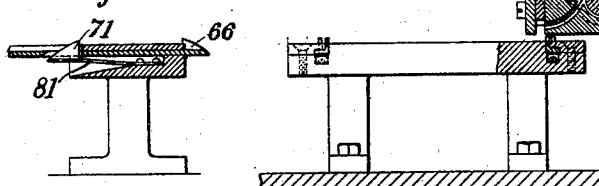
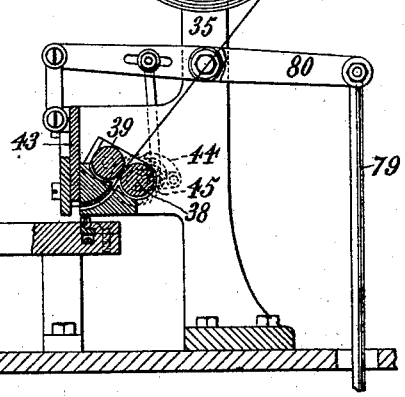
Witnesses: Inventor No. 679,921. Patented Aug. 6, 1901.
W. S. TIMMIS.
MACHINE FOR MANUFACTURING ENVELOPS.
(Application filed June 1, 1900.)

(No Model.) 8 Sheets—Sheet 8.

Witnesses:
Raphaël Netter

Inventor:
Walter S. Timmis

UNITED STATES PATENT OFFICE.

WALTER S. TIMMIS, OF BROOKLYN, NEW YORK, ASSIGNOR OF ONE-HALF TO JAMES T. RUSSELL, OF SAME PLACE.

MACHINE FOR MANUFACTURING ENVELOPS.

SPECIFICATION forming part of Letters Patent No. 679,921, dated August 6, 1901.

Application filed June 1, 1900. Serial No. 18,705. (No model.)

*To all whom it may concern:*

Be it known that I, WALTER S. TIMMIS, a citizen of the United States, and a resident of the city of New York, borough of Brooklyn, county of Kings, State of New York, have invented certain new and useful Improvements in Machines for Manufacturing Envelops, of which the following is a specification.

My invention relates to machines for manufacturing envelops, and more particularly to machines for completing the envelops after blanks for the same have been cut into proper form, and comprises, with other features, means for cutting from a roll of suitable fabric a strip of proper length and for attaching the same to the envelop-blank adjacent to one of the folding-lines thereof, whereby when the blank is folded over along such folding-line the inclosed strip, together with the portions of the blank covering the same, will form a bulky portion, which may be readily taken hold of and torn off for the purpose of opening the envelop without tearing the other portions of the same, all as hereinafter more particularly set forth. The use of a flat strip I consider preferable to the use of a thread or cord on account of the great difficulty experienced in attaching the latter, it having been found impracticable to draw the thread or cord over and affix it in a sufficiently reliable and permanent manner to make it useful as an opener.

In carrying out my invention I use, in combination with the means hereinafter described, which constitute the invention, gumming, picking, and folding devices of a general character, such as are well known in the art. The usual method of manufacturing envelops has heretofore been as follows: The blanks having been cut to proper shape and placed in a pile underneath the pickers, the latter being provided on their under surface with projections which correspond with the areas to be covered with stripes of gum on the blank, would descend, apply gum, previously spread over said projections, to the blank on top of a pile of blanks, and in ascending again would carry such blank with it upward to a proper conveyer, which would deposit it underneath the apparatus for folding the blank and for simultaneously pasting together the edges of the envelop, and thereby completing the same.

In carrying out my invention I provide mechanism, as hereinafter more particularly described, for intercepting the blank in its travel from the picker to the folding device and for placing it underneath a mechanism which cuts a strip from a larger piece or sheet of fabric and immediately afterward pastes said strip along one of the folding-lines of the envelop. The stripe of gum for thus securing said strip has preferably been previously applied to the blank by the picker, but it may instead be applied to the strip itself immediately before cutting it off, as exemplified in some of the accompanying illustrations of my improved appliances. After this operation the blank is shifted to the folding apparatus and the envelop is completed there in the usual manner.

I will now proceed to fully describe my improvements in connection with the accompanying drawings and will set forth more specifically in the claims the features for which I desire protection.

Figure 11:
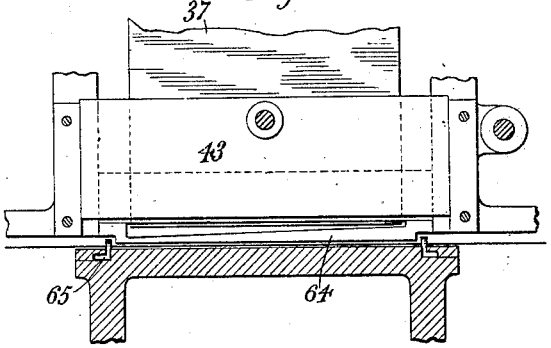
Figure 12:
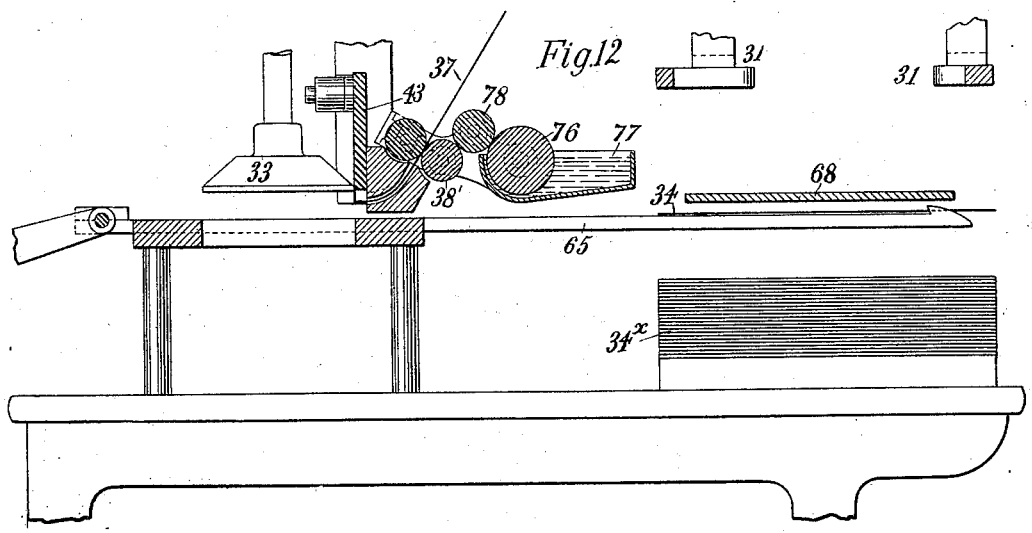
Figure 13:
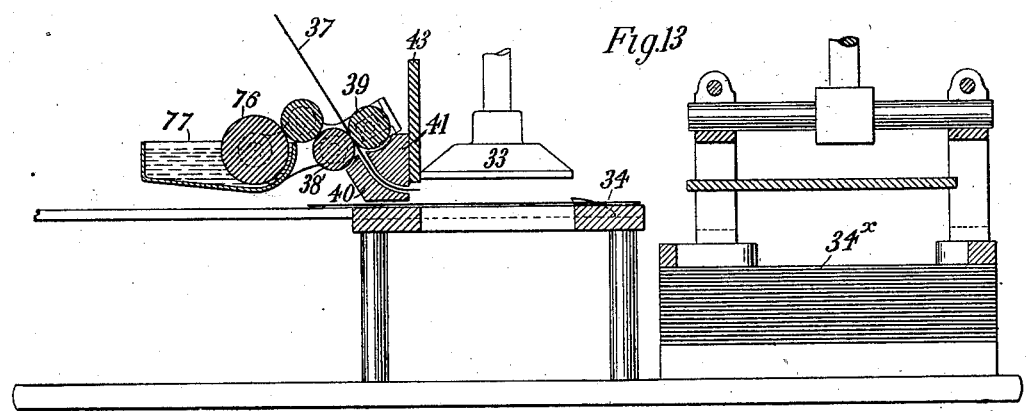
Figure 17:
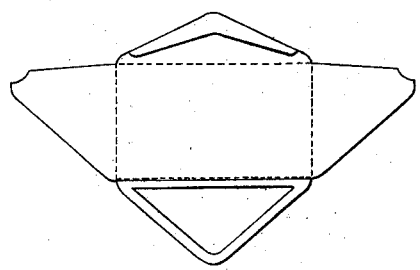

In the accompanying drawings, forming part of this specification, Figure 1 is a side elevation, partly in section, of an apparatus for picking a blank from a pile of blanks, cutting the required strip of fabric from a roll of fabric, pasting one or both sides of it to the blank and also folding and pasting together those edges of the blank which must be joined together so as to complete the envelop ready for use. Fig. 2 is an end elevation, also partly in section, of the apparatus illustrated in Fig. 1, while Fig. 3 is a ground plan, partly in section, of Figs. 1 and 2. Figs. 1 to 3, inclusive, relate to apparatus using a picker which simultaneously applies the stripes of paste or gum to the portions of the blank to be joined to each other and also to those to which the strip of fabric is to be applied, and by the particular form of picker illustrated therein the fabric is applied along the flap on that side of the envelop which is first brought underneath the appliances cutting and applying the piece of fabric. Fig. 4 is a longitudinal vertical section of portions of an apparatus of the character illustrated in the preceding figures, said Fig. 4 relating more particularly to the means for guiding and cutting the strip of fabric and for shifting the blank into positions which it must occupy successively during the different operations referred to, the application of the strip and the folding taking place, however, without any intermediate movement of the blank, the strip being applied to the portion of the blank adjoining the left-hand flap, while in Fig. 5, which otherwise corresponds with Fig. 4, the opposite condition is provided for. Fig. 6 shows the knife for cutting the fabric and the presser for applying it as illustrated in Fig. 1, but on an enlarged scale. The apparatus illustrated in Figs. 7, 8, 9, 10, and 11 shows means for applying gum to the fabric direct after the gum for joining together the edges of the envelop in the usual way has been applied by the picker, Fig. 7 being a side elevation, partly in section, Fig. 8 an end elevation of said appliances looking toward the left of Fig. 7, Fig. 9 a ground plan, partly in section, Fig. 10 an enlarged longitudinal vertical elevation, partly in section, and Fig. 11 such an end elevation, partly in section, of said appliances looking toward the left of Fig. 10. Fig. 12 is a longitudinal vertical section of an apparatus wherein the devices for applying the gum to the fabric and for cutting it are placed close to the folding mechanism and wherein provision is made to cut and apply the fabric and fold the envelop before another blank is subjected to any of these operations. Fig. 13 corresponds with Fig. 12, except that in the former the fabric is applied along the flap on that side of the envelop which last passes underneath the mechanism for cutting and applying the fabric, while in Fig. 13 the opposite condition is provided for. Fig. 14 is a ground plan, partly in section, of an apparatus providing means for applying the strip of fabric along the narrow or end portions of the envelops; and Fig. 15 a vertical section along line 15 15 in Fig. 14. Fig. 16 is a vertical section of a modified form of stopping device for holding the blank in position while the strip of fabric is being applied thereto. Figs. 17 to 23, inclusive, show blanks with stripes of gum applied thereto for the purpose of securing the strips of fabric in different positions relative to the edges of the envelops, and also stripes of gum for pasting together the portions of their edges which are to be joined to each other. Dotted lines indicate where the final folding takes place. In Figs. 17, 19, 20, 21, and 22 the stripe of gum for securing the fabric is shown to be placed along the flaps, to which the picker has also applied stripes of gum for the usual pasting together of the edges of the blanks, while in Figs. 18 and 23 the gum for attaching the fabric is shown to be placed along the short folding-lines. In Figs. 17, 19, and 20 the stripe of gum for attaching the fabric is a continuation of the stripes of gum for securing together the edges of the blanks. In Figs. 17, 18, 19, and 21 the gum is shown to be applied along only one side of a folding-line, thus providing for pasting only one side of the fabric to the blank, while in Figs. 20, 22, and 23 the gum is shown to be applied along both sides of a folding-line, whereby it is made possible to paste both sides of the fabric to the envelop proper.

Figure 18:
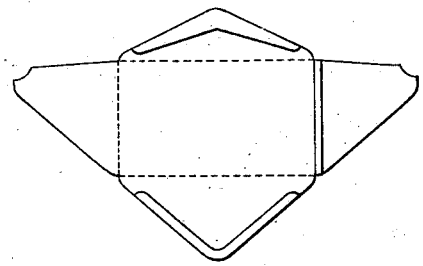
Figure 19:
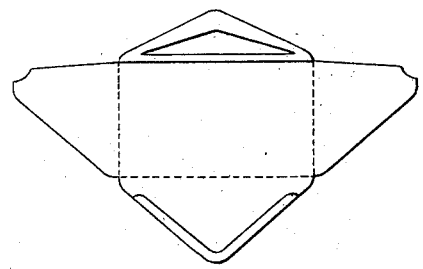
Figure 20:
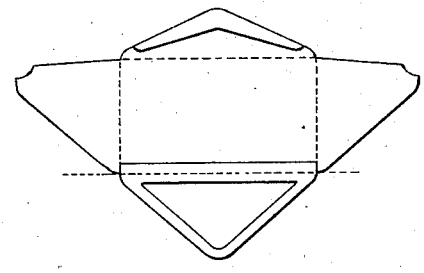
Figure 21:
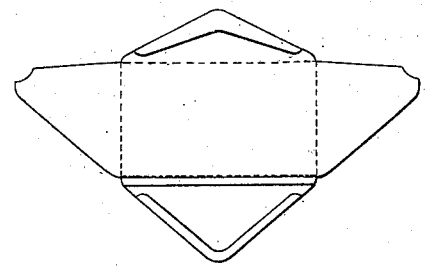
Figure 22:
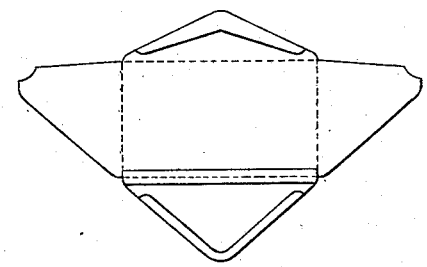
Figure 23:
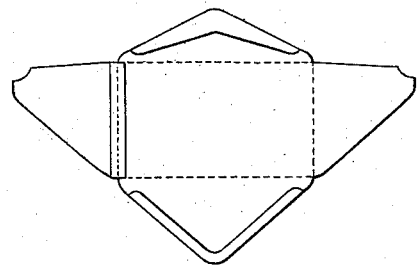

The mechanism illustrated in Figs. 1 to 3 and in Fig. 4 is adapted to manufacture envelops from blanks, as shown in Fig. 17, while Fig. 5 would correspond in that respect with Fig. 19, and apparatus substantially as in Figs. 14 and 15 might be made use of to make envelops from blanks, as shown in Figs. 18 and 23.

Corresponding numerals of reference throughout the different views refer to corresponding parts.

As my present invention does not relate to the details of the apparatus for picking up the envelop and applying the paste thereto, except as far as the configuration of the operative face of the picker is concerned, nor to the folding device, such appliances have only been indicated diagrammatically in the drawings and will not be further described hereinafter.

In all the views of the drawings representing longitudinal elevations or ground plans the travel of the blanks between the various operations takes place from right to left, and where the terms "right" and "left" are employed hereinafter they refer to such views.

Referring, first, to Figs. 1 to 3, inclusive, and to Fig. 6, 30 is a frame or table supporting the picker 31, the device 32 for guiding and cutting the strip of fabric and for pasting it to the blank, and the folding mechanism 33. The operative projections on the under side of the picker (shown in section in Fig. 3) are shown to be of configurations suitable to apply gum to a blank in manner as illustrated in Fig. 17; but it will be understood that any other suitable form may be given to said projections in accordance with the particular form and kind of envelop to be produced and opener to be applied. 34× represents a pile of blanks, one blank (indicated by 34) having been elevated by the picker and afterward brought into the positions which it occupies in Fig. 1 underneath the apparatus for applying the strip of fabric. This apparatus and the means for conveying the blank are constructed as follows: 35 35 are brackets secured to the top of frame 30, which carry upon a reel 36 a roll of fabric 37 of a width corresponding with the length of the strip which it is intended to apply. Fabric 37 passes between two guide-rollers 38 and 39, the latter spring-seated, and two guide-cheeks 40 and 41 of a width corresponding with that of the strip to be applied and underneath a combined knife and presser 43, which serves to cut off said strip from the sheet of fabric 37 and to apply it to the blank. For the purpose of feeding out at all times the proper amount of fabric a pawl 44, actuating a ratchet 45 on the axle of roller 38, is provided. Said pawl receives its movement through rod 46, lever 47, and cam 48, the latter secured to main shaft 49 of the main frame. 50 is a spring for drawing down lever 47. Cam 48 also imparts motion to the combined knife and presser through a rod 51, extending from lever 47 to one end of lever 52, the other end of said lever being attached to said knife and presser, which travel between vertical guides 53 53. As rods 46 and 51 are attached to lever 47 on opposite sides of its fulcrum 54, it will be seen that when pawl 44 actuates ratchet 45, thus feeding forward the fabric, lever 52 will be lifting up the knife and the presser, while the feed will be at rest during the time that said knife and said presser are being forced downward or are held in their most depressed position, owing to the action of spring 50 on lever 47 and the configuration of cam 48, which configuration is such that contact between said cam and contact-roller 55 on lever 47 does not take place during the upward movement of rod 51 while cutting of the fabric and action of the presser takes place, whereby a yielding pressure is imparted to the strip of fabric while it is being applied to the blank.

My preferred form of combined knife and presser 43 provides for the vertical adjustment of knife-blade 56 along a presser 57 by means of set-screws 58, which pass through slots 59 in the upper thickened portion of said blade. Between the lower portion of the knife-blade and presser 56 a recess 60 is provided to permit of the ready sharpening of said blade. The lower edge of blade 56 is made to coact with a stationary blade 61 underneath it, having its upper edge slightly slanting, as shown in Figs. 2 and 11, so as to produce a shearing action in cutting off the strip of fabric after it emerges from between cheeks 40 and 41.

The movement of the blank from underneath the picker to the position in which it has applied to it the strip of fabric and from there to the proper position underneath the folder is accomplished by the following means: 62 is a cam on main shaft 49 and operating an elbow-lever 63, to the upper extremity of which a link 64 is jointed, which draws a conveyer 65 forward and backward. Said cam is shown to be constructed with two circular surfaces of different diameters and lengths and straight surfaces between the same, thus providing for rests of different durations between the forward and backward movements of the conveyer. 66 and 67 are hooks on the upper face of the conveyer, sloping downward from left to right, and thereby adapted to carry blanks from right to left. Cam 62 is so adjusted that the short stop will take place while the right-hand portion of the conveyer is in a position underneath the picker, while the longer stop takes place while said portion is underneath the cutting and pressing device 32. After a blank has been lifted up by the picker above the level of the tops of hooks 66 and 67 the conveyer is moved underneath the same, the lifting of the blank meantime still going on until and after the ungummed portions of the same strike plate 68, whereby said blank becomes detached from the picker and is caused to drop upon the conveyer adjoining hook 66. Thereupon the conveyer is moved toward the left until it comes into the position shown in Fig. 1, when the strip of fabric to be applied to the blank is cut off by the knife and applied in its proper position by the presser. At 69 two apertures are provided in the conveyer facing the blank, one on each side of that portion of the blank to which the strip is applied. Through said apertures play plungers 70, which in the most elevated positions that they are permitted to reach serve to engage such outer portions of the blank by means of their pointed heads 71 sloping downward toward the left and serve to retain the blank until and while the conveyer starts on its travel toward the right, the upward movement so produced being due to the upward pressure of spiral springs 72 actuating said pistons. 73 represents the housings for said pistons and springs secured to table 30. The left-hand sides of apertures 69 slope correspondingly with heads 71, so that as the conveyer travels toward the right heads 71 will thereby become depressed and will release the blank, thus permitting hook 67 to pass underneath and past the blank until it passes and engages with its right-hand edge, hook 66 meantime having reached a position immediately to the right and adjoining another blank which has meantime been elevated by the picker. Then movement of the conveyer toward the left again takes place until the parts once more reach the positions indicated in Fig. 1. It will be seen that the conveyer is divided into two sections or compartments and that by these means two blanks are always being moved by the conveyer while it travels toward the left—viz., one from the picker to the cutter and the other from the latter to the folding device.

In Figs. 7, 8, 9, 10, and 11 connecting-rod 46 operates a pawl 74 in engagement with a ratchet 75 on the shaft of a roller 76, which roller is partly immersed in liquid gum in a receptacle 77 and transfers gum through an intermediate roller 78 to a roller 38' in contact with the under side of the fabric, 39 being the spring-actuated roller on the other side of the fabric. In other respects the construction and operation of this apparatus are substantially the same as that illustrated in Figs. 1, 2, and 3, it being, however, understood that the picker in this case, as shown in Fig. 9, only has operative surfaces for applying gum to the edges of the blank which are to be attached directly to the other parts of said blank and that the strip of fabric is attached to the blank after its under side has been covered with gum by means of the appliances just described.

In Figs. 12 and 13 the constructive features are substantially the same as described with reference to Figs. 7 to 11, inclusive, except that the relative positions of the picker, the means for applying gum to the strip of fabric and for cutting and pasting it upon the blank, and of the folding mechanism are changed so as to complete one envelop before another blank is placed upon the conveyer.

In Figs. 14, 15, and 16 the general character of the appliances shown is the same as that described with reference to Figs. 1, 2, and 3, except that the details of the conveyer are changed, as well as the positions of the devices for gumming, cutting, and applying the strip of fabric with reference to the conveyers. The feeds of the fabric and the knife are both actuated by a connecting-rod 79, deriving its movement from the main shaft and imparting it to a lever 80, which actuates both the feeding and the cutting and pressing mechanism, so that feeding is interrupted while cutting and pressing down of the strip are taking place.

The means for confining the blank in position while the cutting and application of the strip to said blank are taking place (shown in Fig. 16) instead of embodying a plunger with pointed sloping head consist of a leaf-spring 81, having such a head attached to its upper left-hand end, the mode of depressing it by the movement of the conveyer being the same as described with reference to the corresponding device illustrated in Figs. 1 and 2.

I do not wish to confine myself to the details of construction herein set forth, as it will readily be seen that they might be varied to a considerable extent without departing from the spirit of my invention. As I propose to claim in a separate application the improved methods described above and invented by me and which may be carried out by means of the appliances above set forth, I do not claim the same herein.

Having thus described my invention, what I claim as new, and desire to secure by Letters Patent, is—

1. In a machine for making envelops, the combination with a support for an envelop-blank, of mechanism for cutting a strip from a sheet of fabric along a line parallel with the line in which one of the folding-lines of the blank lies when on the support, means for applying a stripe of gum to one of the surfaces which are to be contiguous when the envelop-blank and the strip of fabric are pressed together, mechanism for pressing said strip and said envelop-blank together while maintaining an edge of said strip parallel to said folding-line, and mechanism for folding said blank at said folding-line and over said strip.

2. In a machine for making envelops, the combination with means for applying a stripe of gum to an envelop-blank along one of its folding-lines, of mechanism for cutting a strip from a sheet of fabric along a line parallel with the said folding-line of the blank, mechanism for pressing said strip of fabric upon a portion of the blank to which gum has been applied while maintaining an edge of said strip at the said folding-line, and mechanism for folding the blank along said folding-line and over the edge of said strip and against its face.

3. In a machine for making envelops, the combination with means for applying a stripe of gum to the blank of an envelop along one of its folding-lines, of mechanism for feeding out a sheet of fabric, a knife for cutting a strip from said sheet, a conveyer for placing an edge of said stripe underneath the cutting edge of the knife said cutting edge occupying a line parallel with said folding-line, and mechanism for folding the blank at said folding-line and along the edge of said strip and against its face.

4. In a machine for making envelops, the combination with means for applying a stripe of gum to the blank of an envelop along one of its folding-lines, of mechanism for feeding out a sheet of fabric, a knife for cutting a strip from said sheet, a conveyer for placing an edge of said stripe underneath the cutting edge of the knife in a line parallel with said folding-line, a presser for applying said strip to said stripe, parallel to said folding-line, and mechanism for folding the blank at said folding-line and at the edge of said strip.

5. In a machine for making envelops, the combination with means for applying a stripe of gum to the blank of an envelop along one of its folding-lines, of a knife for cutting a strip from a sheet of fabric, a conveyer for placing an edge of said stripe underneath the cutting edge of the knife, the edge of the knife being in a line parallel with said folding-line, a presser attached to and moving with the knife for applying said strip to said stripe, and mechanism for folding the blank along said folding-line at the edge of said strip and against its face.

6. In a machine for making envelops, the combination with means for applying a stripe of gum to the blank of an envelop along one of its folding-lines, of mechanism for feeding out a sheet of fabric, a knife for cutting a strip from said sheet at right angles to the direction of the feed and parallel with said folding-line, a presser, a conveyer for placing the edge of said stripe underneath the edges of said knife and of said presser, and mechanism for folding said blank at said folding-line at the edge of said strip and against its face.

7. In a machine for making envelops, the combination with means for applying a stripe of gum to the blank of an envelop along one of its folding-lines, of a knife having its cutting edge parallel with said folding-line, a presser placed parallel with said knife, a conveyer for bringing said stripe underneath said presser and for bringing one of the edges of the stripe parallel with and substantially underneath the cutting edge of the knife, and mechanism for folding said blank at said folding-line and at the edge of the strip and against its face.

8. In a machine for making envelops, the combination with means for applying a stripe of gum to the blank of an envelop along one of its folding-lines, of a pair of guide-cheeks for the fabric, means for conducting the fabric between said cheeks, a knife for cutting off a strip of fabric along a line parallel with said folding-line, a presser for applying said strip to said stripe adjacent to said folding-line, the knife being placed between said cheeks and said presser and mechanism for folding said blank against the face of the strip.

9. In a machine for making envelops, the combination with means for applying a stripe of gum to the blank of an envelop along both sides of one of its folding-lines, of means for feeding out fabric, a knife for cutting said fabric, a presser for applying a strip of fabric so cut to said stripe along one side of said folding-line, and means for folding the portion of the blank on the other side of said folding-line which contains a portion of said stripe, against said strip.

10. In a machine for making envelops, the combination with a knife-blade, of a presser, and means for adjustably attaching said knife to said presser, a narrow space being left between the portion of the knife-blade having the cutting edge and the side of the presser to which it is attached.

11. In a machine for making envelops, the combination with a picker, of means for attaching a strip of fabric to a blank, a conveyer adapted to slide between said appliances, a suitable aperture being provided in said conveyer, and a spring-actuated stopping device adapted to operate through said aperture and hold the blank opposite said strip-attaching means.

12. In a machine for making envelops, the combination with a picker, of means for attaching a strip of fabric to a blank, a conveyer adapted to slide between said appliances, a suitable aperture being provided in said conveyer, a spring underneath the conveyer, and a stop in the form of a head having a slanting surface mounted upon said spring, said stop being adapted to hold said blank in position to permit a strip of fabric to be attached adjacent to one of the folding-lines and adapted to be depressed by the conveyer while it slides over said head.

Signed at New York, borough of Manhattan, State of New York, this 31st day of May 1900.

WALTER S. TIMMIS.

Witnesses:
J. E. McGOWEN,
C. HOLLOWAY.